United States Patent [19]
Fuss et al.

[11] Patent Number: 5,866,654
[45] Date of Patent: Feb. 2, 1999

[54] PROCESS FOR PREPARING POLY (VINYL ACETALS) AND POLY (VINYL KETALS)

[75] Inventors: Robert W. Fuss, Kelkheim; Matthias Gutweiler, Taunusstein; Martin Baumgartner, Eschborn, all of Germany

[73] Assignee: Clariant GmbH, Frankfurt, Germany

[21] Appl. No.: 850,555

[22] Filed: May 2, 1997

[30] Foreign Application Priority Data

May 4, 1996 [DE] Germany ............... 196 17 893.2

[51] Int. Cl.⁶ ..................................... C08F 8/28
[52] U.S. Cl. ............................... 525/56; 525/61
[58] Field of Search ...................... 525/56; 1/61

[56] References Cited

U.S. PATENT DOCUMENTS

| | | |
|---|---|---|
| 2,258,410 | 10/1941 | Dahle . |
| 2,496,480 | 2/1950 | Lavin et al. . |
| 3,153,009 | 10/1964 | Herman . |
| 3,926,918 | 12/1975 | Shibata et al. . |
| 4,400,565 | 8/1983 | Darden et al. ................ 585/10 |
| 4,464,204 | 8/1984 | Niekamp et al. ............... 127/36 |

FOREIGN PATENT DOCUMENTS

| | | |
|---|---|---|
| 891745 | 10/1953 | Germany . |
| 216028 | 11/1984 | Germany . |
| B-17064 | 8/1964 | Japan . |
| WO 93/19840 | 10/1993 | WIPO . |

OTHER PUBLICATIONS

Yamamoto et al., translation of JP 39–17064 (Aug. 1964).
Weitkamp et al., Stud. Surf. Sci. Catal., 94 (Catalysis by Microporous Materials) pp. 363–380, 1995.

*Primary Examiner*—Jeffrey Mullis

[57] ABSTRACT

A process for preparing poly(vinyl acetals) or poly(vinyl ketals) by reacting poly(vinyl alcohol) with an aldehyde or ketone in the presence of a catalyst which contains acid groups which are chemically bound on a sheet-like support which is insoluble in the reaction medium.

13 Claims, 2 Drawing Sheets

PROCESS FOR PREPARING POLY ( VINYL ACETALS ) AND POLY (VINYL KETALS)

FIELD OF THE INVENTION

The present invention relates to a process for preparing poly(vinyl acetals) and poly(vinyl ketals) by heterogenous catalysis.

DESCRIPTION OF THE PRIOR ART

The preparation of poly(vinyl acetals) is usually carried out by homogeneously acid-catalyzed condensation of poly (vinyl alcohol) and aldehyde in aqueous media. Aldehydes having up to four carbon atoms exhibit limited miscibility with water, so that their reactions are not tied to phase interfaces.

Frequently employed catalytically active acids are hydrochloric acid, sulfuric acid, nitric acid or p-toluenesulfonic acid. Although the acid used is not consumed and could therefore be used in catalytic amounts, in practice a stoichiometric amount and in some cases even a greater than stoichiometric amount is required, since the product, as it forms, traps the acid in its granules which are insoluble in the reaction medium and makes it unavailable for further reaction. Such processes are described, for example, in DE-B 23 65 005, DE-B 12 47 663 and DE-C 891 745.

Another drawback with these processes is the fact that the acid used must be removed or neutralized once the reaction is complete. The acetals formed are not sufficiently stable in an acidic medium (see also Houben-Weyl, Georg Thieme Verlag, Stuttgart, Methoden der organischen Chemie, 4th edition, Vol. E 14a/1, 1991). The products obtained, which usually precipitate from the reaction medium, are therefore isolated by screening, centrifuging or other suitable process steps and then freed from residual acid by washing steps which are repeated a number of times. Since, however, the granular products obtained still contain residual acid within the granules, it is even customary to carry out a subsequent neutralization or alkalinization (U.S. Pat. No. 2,258,410), to stabilize the products at an alkaline pH.

Environmentally and economically this process causes problems, since the amounts of acid and salt resulting therefrom have to be disposed of by suitable treatments of the wash water. Depending on the process, the amounts of acid used vary, but always involve large volumes which have to be treated. There is the additional aspect of the salts which result from neutralization and of the alkalis which are produced during alkalinization and subsequent washing processes.

Moreover, these processes require the use of extremely high-grade and cost-intensive reactor materials. Particularly useful for this purpose is a material made from hasteloy alloys, which has high corrosion resistance. Not only is such a plant capital-intensive during the construction phase, it is also distinguished by high operating costs when running.

A further drawback consists in the mode of operation to be employed, which is discontinuous, in the form of batches. This mode of operation is personnel-intensive and entails relatively low space-time yields (=plant capacity utilization).

A further process version, described for example in U.S. Pat. No. 2,496,480, starts from an alcoholic poly(vinyl alcohol) suspension which is acetalized. The resulting product solution is homogeneous, in contrast to the version described earlier, so that insoluble fractions can readily be removed. The acids employed for this purpose are likewise dissolved in the solvent. The main drawback of this version is, in addition to the corrosion problems described, the difficulty of precipitating the product and the expensive solvent work-up required.

Further processes employ ion exchanger resins in the $H^+$ form (JP-B 17064-64) or ion exchanger resins partially blocked by alkali metal ions (DD-A 216 028) as catalysts for acetalization reactions with poly(vinyl alcohol). The drawbacks of these processes reside in the separation of product and ion exchanger, which are both present in the solid phase once the poly(vinyl alcohol) has been converted up to the desired level of virtually complete acetalization. If the acetalization is carried out, for example, in a tube packed with ion exchanger, precipitating product will cause complete clogging of the apparatus and will thus cause the reaction to come to a standstill.

Thus, there is a need for a process for preparing poly (vinyl acetals) or poly(vinyl ketals) which can avoid the automatic production of waste acid and can allow the use of cheaper corrosion-resistant materials in reaction and workup zones and which can preferably be carried out continuously. It is an objective of this invention to satisfy these needs.

SUMMRY OF THE INVENTION

The objective of this invention is sought by utilizing a supported acid as the catalyst for the condensation of the starting materials, i.e. an acid or acidic groups which is or are fixed on a suitable support material.

The present invention therefore relates to a process for preparing poly(vinyl acetals) or poly(vinyl ketals) by reacting poly(vinyl alcohol) with an aldehyde or ketone in the presence of a catalyst which contains acid groups which are chemically bound on a sheet-like support which is insoluble in the reaction medium. Suitable supports may be made of organic or inorganic material, in which the acid groups are optionally bound via spacers.

The term "sheet-like support" refers to support materials with two major surfaces having flat or curved portions and relatively small or negligible minor surfaces, i.e. generally two-dimensional support materials such as sheets, films, membranes, plates, hollow tubes, or the like. At least one of the two major surfaces of the sheet-like support is active in the process (is acidic), and the starting materials are reacted while in contact with or in the presence of this active surface.

The term "chemically bound", as applied to acids or acid groups on the sheet-like support, encompasses, for example, pendent groups on an organic polymer chain which contain acidic groups (e.g. $-SO_3H$, $-COOH$, $-PO_3H_2$, $-PO_3H-$, etc.) Or acidic radicals chemically linked to an organic or inorganic surface, directly or via spacers, whereby the acetalization or ketalization can proceed in a medium in contact with the sheet-like support while the acidic radicals remain fixed in place.

BRIEF DESCRIPTION OF THE DRAWINGS

In the accompanying Drawing.

DETAILED DESCRIPTION

Figure 1:
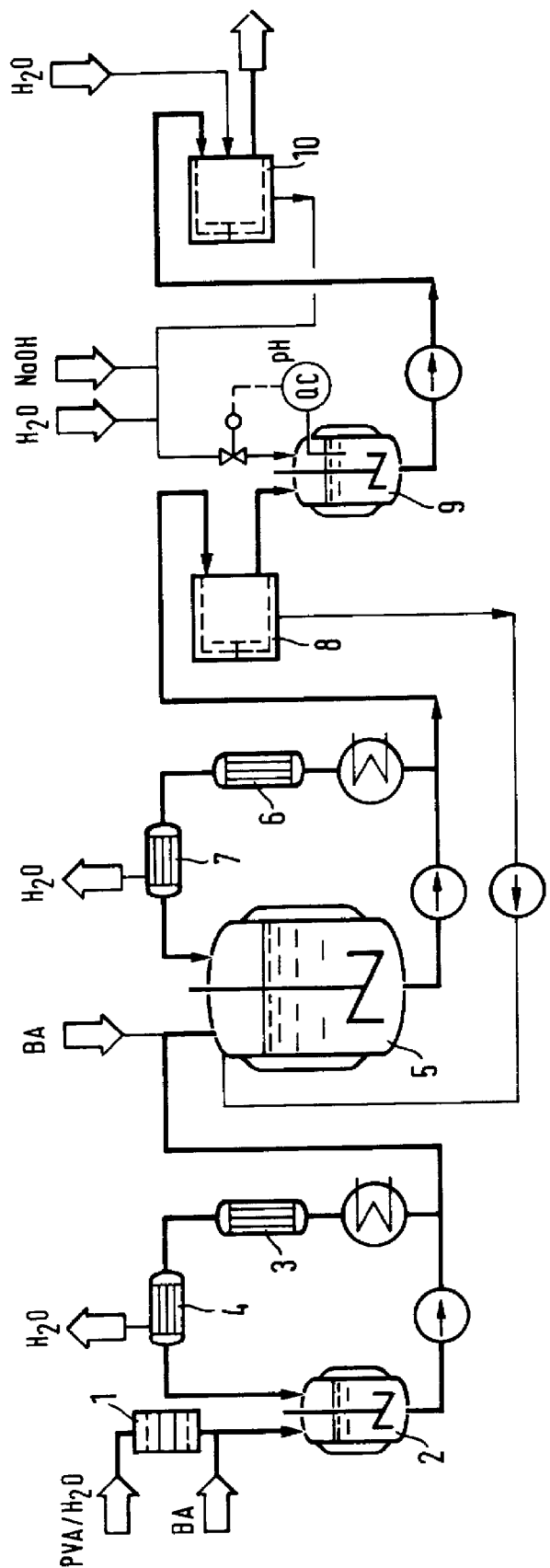
FIG. 1 is a process flow sheet illustrating the process steps or stages and schematically illustrating the apparatus used in a preferred process for preparing a poly(vinyl acetal) or poly(vinyl ketal), in this case poly(vinyl butyral)

Supported acids which can be used include, for example polymer films, in particular membranes, carrying free acid groups. The polymer films modified with acid groups are preferably as stable as possible under the reaction conditions. The polymer films can carry any type of acid groups, for example sulfonic acid groups, phosphonic acid groups and/or carboxy groups.

For the purpose of the invention, cation exchange membranes are preferentially used which carry —$SO_3H$, COOH, —$PO_3H_2$, —$PO_3H^-$, preferably sulfonic acid groups. Materials of this type are commercially available and require no further modification. The particularly preferred membranes are known as electrically charged barriers or indeed as ion exchanger membranes. The properties and the preparation of such membranes have been described in detail in connection with their use as ion exchanger membranes.

The membranes selected for use in this invention are further distinguished by good mechanical stability and by dimensional stability, in particular by exhibiting little tendency to swell or shrink in the reaction medium. The chemical stability should extend over the range from pH 1 to 14, but should obtain especially in the acidic and neutral pH range.

Utilized as an organic polymer matrix for the membranes are hydrophobic polymers such as polystyrene, polyethylene or polysulfones which are optionally cross-linked, e.g. for even greater stability or the like. They are then, for example, sulfonated and are commercially available as sulfonated polystyrene/divinylbenzene membranes, sulfonated polysulfones, polyacrylonitrile/methallylsulfonate copolymer membranes.

Also suitable are membranes of the type ®NAFION (trademark of the DuPont Company for fluorinated solid polymers described below) or ®Flemion (product of Asahi Glass, described below). These are perfluorinated membranes which were prepared from tetrafluoroethylene and a monomer containing sulfonic acid groups and/or carboxyl groups. In the case of NAFION, pendent groups on the polymer are terminated with sulfonic acid radicals; the polymers can be cast in film form from solutions containing an aliphatic alcohol solvent. These membranes are preferably employed in their $H^+$form, in which form they are commercially available.

Also available as sheet-like supports for acid groups are various inorganic membranes, for example based on zeolites and bentonites. Such supports are described, for example, in F. Helfferich, Ion-Exchange, McGraw-Hill, London, 1962.

The supported acids used can also be in the form of sheets made of glass, to which the radicals carrying acid groups have been fixed chemically. Such glasses are described, for example, in K. Tanabe, Solid Acids and Bases, Academic Press, New York —London, 1970, pp. 45 et seq. Such glasses are available, for example, under the trade name ®Deloxan (Degussa).

The acetalization of poly(vinyl alcohol) is preferably carried out with $C_1$–$C_{10}$-aldehydes, particularly ($C_1$–$C_4$)-aldehydes, and particularly preferably $C_1$–$C_4$-aliphatic aldehydes. Particularly suitable is n-butyraldehyde. The ketalization preferentially takes place with ($C_3$–$C_{10}$)-ketones, in particular acetone and cyclohexanone.

The poly(vinyl alcohols) used include both partially and fully saponified types, preferably having a degree of hydrolysis of from 60 to 100 mol %, and copolymeric poly(vinyl alcohols), for example poly(vinyl alcohols) prepared with monomers containing sulfonic acid groups and/or carboxyl groups. In principle, any non modified and modified poly(vinyl alcohol) can be used. The degrees of polymerization of the poly(vinyl alcohols) used preferably extend from 100 to 6000, in particular from 150 to 500.

The preparation of the poly(vinyl acetals) or poly(vinyl ketals) can also employ conventional emulsifiers and oxidation stabilizers.

As a result of the procedure according to the invention, the poly(vinyl acetal) or poly(vinyl ketal) produced, which is insoluble in water, can be removed from the reaction medium in a simple manner and does not have to be freed from acid fractions. The acid remains on the support and can be utilized for further reactions, since it acts catalytically and is not consumed.

A preferred continuous process for preparing poly(vinyl acetal) employs at least two reaction stages (referred to hereinafter as the "prereactor" or "prereactor zone" and the "main reactor" or "main reaction zone") and subsequent work-up stages. Recirculation streams or zones are preferably included in the process.

The optionally cooled starting materials are metered continuously into the prereactor and are mixed by means of a suitable stirrer. It is preferred to free the poly(vinyl alcohol) starting material from cations (using an ion exchanger) prior to feeding it into the prereactor. Choosing suitable conditions, for example recirculation, ensures that there is continuous flow against the acid groups-containing support and that the intermediate formed cannot adhere to the support surface or surfaces and is carried away. The reactor size depends on the desired mean residence time. Excess water, for example from the condensation reaction, can be separated off in the reactor itself or in the recirculation stream, for example via a membrane module or some other suitable apparatus. This ensures that the concentration in the reactor remains constant over time and the reaction can at all times proceed under optimum conditions. The reaction can be carried out at constant temperature, either via jacket cooling or via a heat exchanger which is likewise installed in the recirculation stream.

The reaction in the prereactor preferably takes place at a temperature from 1° C. to 70° C., in particular at from 1° C. to 25° C., particularly preferably at from 1° C. to 15° C. The mean residence time τ in the prereactor is preferably from 10 to 120 minutes, in particular from 20 to 40 minutes. The reaction can be carried out at ambient pressure. The partial reaction of poly(vinyl alcohol) and aldehyde initially gives rise to a partially acetalized product. As the conversion (degree of acetalization) progresses, said partially acetalized product precipitates from the solution. In this preferred process, the reaction mixture is then transferred into a second reactor (the main reactor) in the form of a solution or suspension.

In the main reactor of the preferred process, the conversion is continued up to the desired degree of acetalization. This likewise happens on a support surface which contains acid groups. As in the prereactor, said surface may be either installed in the reactor itself or in the recirculation stream. If required, separation of water can again take place in the main reactor itself or in its recirculation stream, for example via a membrane module or some other suitable apparatus. If required, additional aldehyde is metered into the main reactor, to achieve the desired degree of acetalization. Here again, temperature control is effected via the reactor jacket or a heat exchanger situated in the recirculation stream. The temperature in the main reaction zone is preferably at from 1° C. to 80° C., in particular at from 5° C. to 65° C., particularly preferably at from 10° C. to 50° C. The mean residence time in the reactor is preferably from 60 to 300 minutes, in particular from 90 to 180 minutes. The reaction can be carried out under ambient pressure. After the desired residence time, the product suspension is passed on to a suitable apparatus for solid/liquid separation, for example through a centrifuge, in which the solid is separated from the reaction solution.

In the preferred process, the reaction solution, which may still contain dissolved starting material, is preferably recycled into the main reactor. To adjust the pH, the solid can be slurried with aqueous alkali, for example with sodium hydroxide or potassium hydroxide, in a further apparatus, for example a stirred tank reactor or a solids blender. In a second, subsequent solid-liquid separation the product can additionally be washed. If required, the resulting liquor will be recycled once more in the upstream slurrying apparatus, to adjust the pH. The washed product can then be dried in a suitable drier, for example belt drier, disk drier, paddle drier and then be packaged.

Turning now to the Drawing, a schematic continuous, multi-step preparation process for preparing poly(vinyl butyral) is shown, by way of example, in the process flow diagram of FIG. 1. The reactors 3 and 6 are preferably continuous stirred-tank reactors or tubular reactors. The reaction takes place on the reactive sites of a sheet-like support carrying suitable acid groups. The reactive surface of the support may be located in the reactor itself or in a recirculation cycle. In the reactors, the stirrer can, for example, be encompassed by a draft tube on whose surface the sheet-like support containing reactive acid groups is located.

Figure 2:
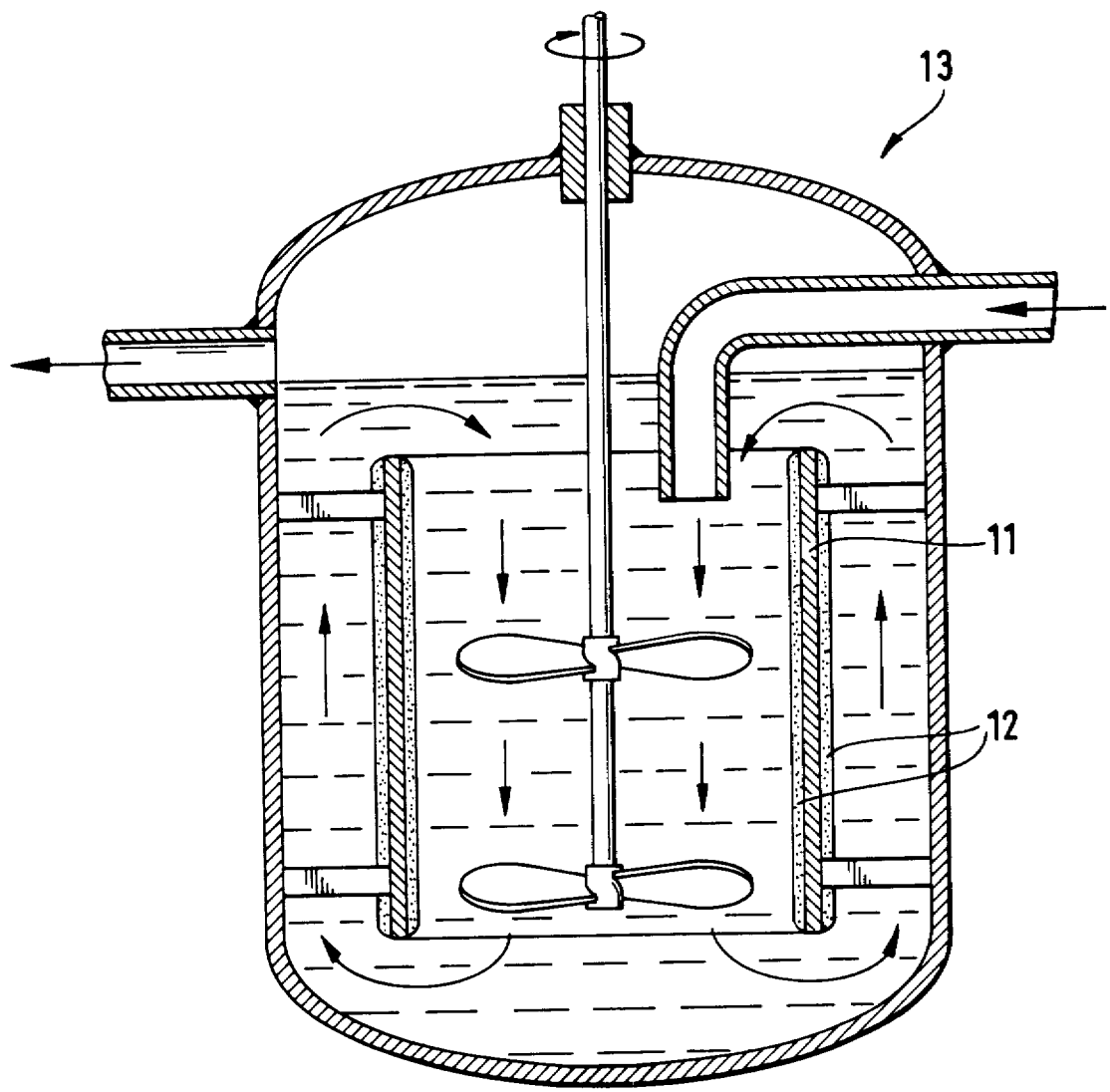
FIG. 2 is a cross-sectional view illustrating a preferred type of reactor containing reactive acid groups fixed to a tubular surface.

FIG. 2 illustrates a preferred type of reactor 13 having such a draft tube 11 on whose surface the sheet-like support 12 containing reactive acid groups is located.

In the recirculation stream or zones of the preparation process scheme shown in FIG. 1, suitable installations include, for example, a membrane hollow-fiber module or a shell-and-tube reactor onto whose tubes an ion exchanger membrane is fixed.

In the preferred process illustrated in FIG. 1, the process is subdivided into 6 phases. Upstream of the prereactor there is an ion exchanger 1, in which the aqueous poly(vinyl alcohol) solution is freed from cations (phase A).

The first step of the conversion, the partial acetalization, takes place in the prereactor comprising tank 2, reactor 3 and module 4 (phase B). For this purpose, poly(vinyl alcohol), optionally in a cooled state, as an aqueous solution (PVA/$H_2O$) and butyraldehyde (BA), optionally cooled also, are fed continuously into the tank 2 and mixed intensively. By being recirculated, this solution reaches the reactor 3 which, for example, is a shell-and-tube reactor or a hollow-fiber module reactor. Then the solution flows through the dewatering unit (module 4), which for example comprises a suitable membrane module. Having attained the desired residence time τ, the reaction mixture is transferred into the tank 5 (phase C). Tank 5, together with the reactor 6 and the module 7 constitutes the main reactor. The reactor 6 and the module 7 are identical or similar to the components of the prereactor. In a manner similar to the prereactor reaction, the reaction is continued up to the desired degree of acetalization, butyraldehyde (BA) being added as required for this purpose. Having attained the desired residence time τ, the product suspension reaches the solids separation unit 8 (phase D). While the separated reaction solution is recycled into the tank 5, the solid product passes into the tank 9, where the pH is adjusted by the addition of alkali and water (phase E). Then this suspension is transferred into the washing and product separation unit 10 (phase F). The washed, filtered product is subsequently dried in the drier and from there is passed through packaging or direct further processing.

Parts and percentages in the following examples relate to weight, unless stated otherwise.

EXAMPLES

Example 1

A 2 liter cooled-wall beaker is charged with poly(vinyl alcohol) in the form of an 8% strength solution of ®Mowiol 28–99 (91.5 g; about 2 mol), completely deionized water and butyraldehyde (57.48 g, 0.79 mol) at an internal temperature of 13° C. Previously, the poly(vinyl alcohol) solution had been passed over an ion exchanger to remove cations. A cation exchanger membrane of type ®Nafion 117 (ionic form $H^+$) is introduced. The pH of the solution is 3. Beforehand, the membrane had been soaked in DI water for about 3–5 hours and been preswelled as a result. After 15 minutes the solution clouds and becomes milky. Small floccules are formed, and when the stirrer is switched off the suspended particles which have formed settle on the bottom. After about 120 minutes the reaction can be discontinued and the product formed be filtered off. Washing with 5% strength aqueous sodium hydroxide resulted in the pH being set to about 8. After brief rinsing with water the product is dried in the drying oven at temperatures up to at most 50° C. Final weight: 95 g, solids content 98.73%. The analysis gives a poly(vinyl alcohol) content of 20.82% (according to DIN 53783/53240).

The viscosity of the 5% strength ethanolic solution, measured in accordance with DIN 53015 (Höppler falling-sphere viscometer) is 80 mPa·s.

Example 2

A 2 liter cooled-wall beaker is charged with poly(vinyl alcohol) in the form of a 9% strength solution of Mowiol 4–98 (124.8 g; about 2.8 mol) in completely deionized water and butyraldehyde (119.57 g, 1.64 mol) at an internal temperature of 15° C. Beforehand, the poly(vinyl alcohol) solution was freed from cations via an ion exchanger. The cation exchanger membrane of type NAFION 117 (ionic form $H^+$) is introduced, the pH of the solution is 3. Beforehand, the membrane had been soaked in DI water for about 3–5 hours and been preswelled as a result. After 15–20 minutes the solution clouds and becomes milky. Small floccules are formed, and when the stirrer is switched off these settle on the bottom. After about 120 minutes the reaction is finished and the product formed can be filtered off. Washing with 5% strength aqueous sodium hydroxide resulted in the pH being set to about 8. After brief rinsing with water the product is dried in the drying oven at temperatures up to at most 50° C. Final weight: 120 g, solids content 98.53%. The analysis gives a poly(vinyl alcohol) content of 29.3% and an OH number of 373.8 mg of KOH/g (according to DIN 53783/53240 and ISO/DIS 4629). The viscosity of the 5% strength ethanolic solution, measured in accordance with DIN 53015 (Höppler falling-sphere viscometer) is 60 mPa·s.

Example 3

A 2 liter cooled-wall beaker is charged with poly(vinyl alcohol) in the form of a 10% strength solution of Mowiol 8–88 (124.8 g; about 2.8 mol) in completely deionized water and butyraldehyde (119.57 g, 1.64 mol) at an internal temperature of 15° C. Previously, the poly(vinyl alcohol) solution had been passed over an ion exchanger to remove cations. The cation exchanger membrane of type ®NAFION 117 (ionic form $H^+$) is introduced, the pH of the solution is 3. Beforehand, the membrane had been soaked in DI water for about 3–5 hours and been preswelled as a result. After about 30 minutes the solution clouds and becomes milky. Small floccules are formed, and when the stirrer is switched off these settle on the bottom. After about 180 minutes the reaction is finished and the product formed can be filtered off. After brief rinsing with water the product is dried in the drying oven at temperatures up to at most 50° C. Final weight: 140 g, solids content 96.8%. The analysis gives a poly(vinyl alcohol) content of 15% (according to DIN 53783/53240). The viscosity of the 15% strength ethanolic solution, measured in accordance with DIN 53015 (Höppler falling-sphere viscometer) is 98 mPa·s.

What is claimed is:

1. A process for preparing a poly(vinyl acetal) or a poly(vinyl ketal) which is insoluble in the reaction medium, comprising: reacting poly(vinyl alcohol) with an aldehyde or ketone in a reaction medium in the presence of a catalyst until particles, insoluble in the reaction medium and comprising said poly(vinyl acetal) or poly(vinyl ketal), are formed, said catalyst containing acid groups which are chemically bound on a two-dimensional support which is insoluble in the reaction medium.

2. The process as claimed in claim 1, wherein said support comprises a polymer film.

3. The process as claimed in claim 1, wherein the catalyst comprises a cation exchanger membrane.

4. The process as claimed in claim 1, wherein said support comprises an inorganic material.

5. The process as claimed in claim 4, wherein said inorganic material is a zeolite, a bentonite or a glass.

6. The process as claimed in claim 1, wherein said acid groups which are chemically bound on said support are sulfonic acid, phosphonic acid or carboxylic acid groups or combinations thereof.

7. The process as claimed in claim 1, wherein said aldehyde comprises n-butyraldehyde.

8. The process as claimed in claim 1, wherein said poly(vinyl alcohol) has a degree of hydrolysis of from 60 to 100 mol % and a degree of polymerization of from 150 to 5000.

9. The process as claimed in claim 1, wherein the preparation of the poly(vinyl acetal) or poly(vinyl ketal) is carried out continuously.

10. The process as claimed in claim 1, wherein the poly(vinyl alcohol) and the aldehyde or the ketone are metered continuously into a first reactor, where they are partially reacted in the presence of said catalyst until particles insoluble in the reaction medium and comprising said poly(vinyl acetal) or poly(vinyl ketal) are formed, and are then transferred into a second reactor, where the partial reaction is continued further in the presence of said catalyst on a said support located in said second reactor.

11. The process as claimed in claim 10, wherein the reaction in the first reactor is carried out at a temperature of from 1° to 70° C. and a mean residence time of from 10 to 120 minutes and the reaction is continued further by continuing the reaction in the second reactor at a temperature of from 1° to 80° C. and a mean residence time of from 60 to 300 minutes.

12. A process for preparing a poly(vinyl acetal) or poly(vinyl ketal) over a period of time comprising at least two residence times, comprising:

a. for a first residence time, partially acetalizing or ketalizing poly(vinyl alcohol), said poly(vinyl alcohol) being dissolved in an aqueous medium, with a $C_1$–$C_{10}$-aldehyde or $C_3$–$C_{10}$-ketone in a first reaction zone to which said aqueous medium and said aldehyde or ketone are fed continuously, thereby obtaining a reaction medium which produces a partially acetalized or partially ketalized product, said first reaction zone containing an acid catalyst comprising a two-dimensional support which is insoluble in the reaction medium and which contains acid groups chemically bound thereon, the resulting partially acetalized or partially ketalized product being in the form of particles insoluble in the reaction medium, b. transferring said partially acetalized or partially ketalized product and the reaction medium to a second reaction zone and further acetalizing or further ketalizing said partially acetalized or partially ketalized product, for a second residence time, in the presence of said acid catalyst and optionally in the presence of additional aldehyde or ketone, to obtain a solid suspension comprising the reaction medium and poly(vinyl acetal) or poly(vinyl ketal) particles insoluble in said reaction medium, c. recovering an essentially acid-free poly(vinyl acetal or poly(vinyl ketal) particles by separating said particles from said suspension.

13. The process as claimed in claim 1, wherein the reaction medium comprises water.

* * * * *